United States Patent
Viviroli

(10) Patent No.: US 7,794,292 B2
(45) Date of Patent: Sep. 14, 2010

(54) METHOD AND DEVICE FOR DETERMINING THE GEOMETRICAL DATA OF A WIRE FITTING

(75) Inventor: Stefan Viviroli, Horw (CH)

(73) Assignee: Komax Holding AG, Dierikon (CH)

( * ) Notice: Subject to any disclaimer, the term of this patent is extended or adjusted under 35 U.S.C. 154(b) by 328 days.

(21) Appl. No.: 11/687,008

(22) Filed: Mar. 16, 2007

(65) Prior Publication Data

US 2007/0218749 A1    Sep. 20, 2007

(30) Foreign Application Priority Data

Mar. 16, 2006   (EP)   ................................. 06111270

(51) Int. Cl.
*H01R 4/50* (2006.01)
(52) U.S. Cl. ...................................... 439/894
(58) Field of Classification Search ................. 439/397, 439/894; 324/750, 529, 207.17; 356/602, 356/613, 620, 616; 250/234
See application file for complete search history.

(56) References Cited

U.S. PATENT DOCUMENTS 3,833,807 A * 9/1974 Takeda ........................ 250/234
6,172,754 B1 * 1/2001 Niebuhr ....................... 356/602
2003/0048459 A1 * 3/2003 Gooch .......................... 356/620
2004/0266276 A1 * 12/2004 Hariki et al. ................. 439/894

FOREIGN PATENT DOCUMENTS

| DE | 19811573 C1 | 6/1999 |
|----|-------------|--------|
| EP | 0667658 A2 | 8/1995 |
| EP | 1780846 A1 | 5/2007 |
| FR | 2553914 A | 4/1985 |
| JP | 09171878 A | 6/1997 |

OTHER PUBLICATIONS

EP 05110077.4.

* cited by examiner

*Primary Examiner*—Alexander Gilman
(74) *Attorney, Agent, or Firm*—Fraser Clemens Martin & Miller LLC; William J. Clemens

(57) ABSTRACT

A method for contactless scanning of a wire fitting wherein the wire fitting is scanned by a first distance sensor and by a second distance sensor. The first distance sensor contactlessly scans the wire fitting, in this case a conductor crimp of a crimp contact, multiple times from below. The second distance sensor contactlessly scans the conductor crimp of the crimp contact from above. From the measurement values with the associated "x", "y" coordinates, geometrical data of the wire fitting are determined.

9 Claims, 7 Drawing Sheets

METHOD AND DEVICE FOR DETERMINING THE GEOMETRICAL DATA OF A WIRE FITTING

FIELD OF THE INVENTION

The invention relates to a method and a device for determining the geometrical data of a wire fitting, wherein the surface of the wire fitting is scanned and the geometrical data of the wire fitting is determined therefrom according to the definition of the independent patent claims.

BACKGROUND OF THE INVENTION

From European patent application EP 05110077.4 a device for measuring the height of a crimp contact has become known. Details thereof are shown in FIGS. 1 to 3 herein.

FIGS. 1 to 3 show diagrammatically measurement by mechanical means of the height of a wire fitting as, for example, a crimp contact 1. The crimp contact 1 that is pressed onto a wire 2 has a conductor crimp 3 and an insulation crimp 4, the conductor crimp 3 surrounding a wire conductor 5 and the insulation crimp 4 surrounding a wire insulation 6. In the crimping operation, the conductor crimp 3 and the insulation crimp 4 are plastically deformed and pressed by means of the crimping die and crimping anvil into the form shown. A first blade 7 that is connected to a vertically movable upper part of a measuring device is in contact with the upper side of the conductor crimp 3. A point 8 that is connected to a lower part of a measuring device is in contact with the lower side of the conductor crimp 3. The position of the blade 7 can be measured by means of a linear measuring device. The position of the point 8 can be measured by means of the linear measuring device. The difference between the two positions corresponds to the height H of the crimp contact 1 that is shown in FIGS. 2 and 3.

FIG. 3 shows a cross section of the conductor crimp 3 with the contact points that are relevant for measuring the height of the crimp contact 1. On the upper side of the conductor crimp 3, at a first point 9 and a second point 10, the blade 7 is connected to the conductor crimp 3. On the lower side of the conductor crimp 3, at a third point 11, the point 8 is connected to the third point 11. Designated with 12 are burrs that come into being on the lower side of the conductor crimp 3 during the crimping operation as a result of play that is required between the crimping die and the crimping anvil. The crimp height H is determined from the distance between the upper side of conductor crimp 3 that is defined by the first point 9 and the second point 10 and the lower side that is defined by the third point 11.

Disadvantageous in this device is that with small crimp contacts with conductor crimp lengths below 2 mm, the crimp heights cannot be measured because the mechanical side and height centerings of this measuring device occupy a certain amount of space. Furthermore, the mechanical measuring device must be made very fine and very precise so that the desired measuring accuracy can be assured, which in turn negatively affects the manufacturing costs.

SUMMARY OF THE INVENTION

It is here that the present invention sets out to provide a remedy. The invention provides a solution for avoiding the disadvantages of the known device, and creating a method and a device by means of which the geometrical data of a wire fitting can be automatically determined.

The advantages achieved by means of the present invention are mainly to be seen in that the surface of a wire fitting can be contactlessly and therefore wearlessly scannable. Also advantageous is that the wire fitting can be inspected over a large area. The wire fitting can thus be evaluated in its entirety. With the method according to the present invention, a surface model of the wire fitting can be created. From this, further data such as distances, cross sections, etc. can be derived. For wire fittings, further mechanical centering devices are no longer needed. Measuring errors due to incorrect centering of wire fittings during the measuring process are eliminated from the start. With the method according to the present invention, the geometrical data of small wire fittings can be determined as well as those of large wire fittings. Furthermore, wear of the tools that process the wire fittings can be promptly detected from the deviating geometrical data of the wire fittings.

With the method according to the present invention, and with the device according to the present invention, the surface of the wire fitting is scanned, and geometrical data of the wire fitting determined therefrom, and with a plurality of contactless distance measurements a surface model of the wire fitting is created, and the geometrical data of the wire fitting determined therefrom. This method is suitable for manual workplaces, semi-automatic machines, and fully automatic machines.

In the case of fully automatic machines, with the device according to the present invention, wire fittings can be measured on a random sampling basis according to the method according to the invention also during production.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
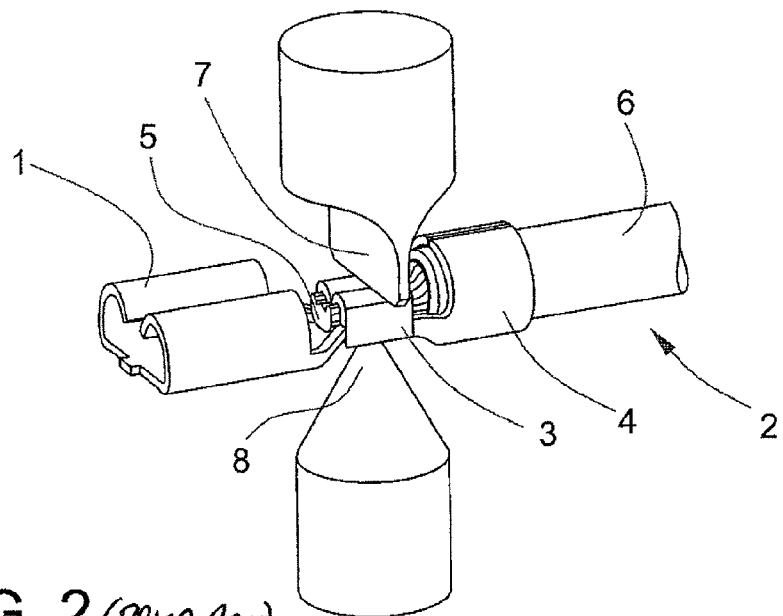
FIGS. 1 to 3 are diagrammatical representations of measurement by prior art mechanical means of the height of a wire fitting.
Figure 2:
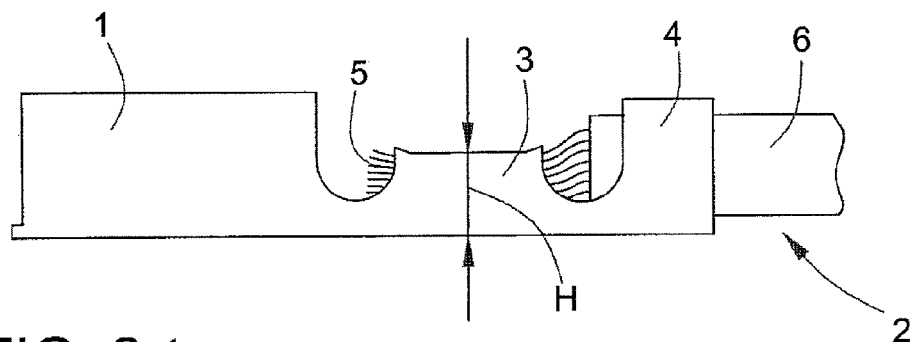
Figure 3:
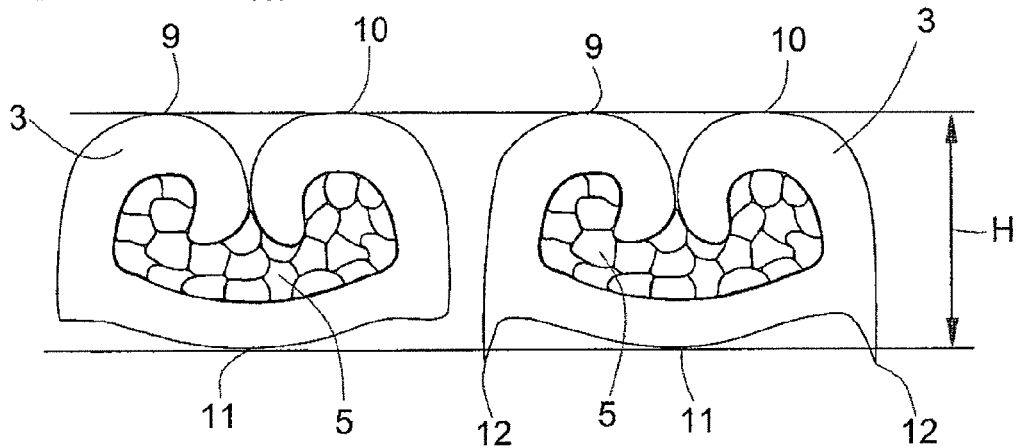
Figure 4:
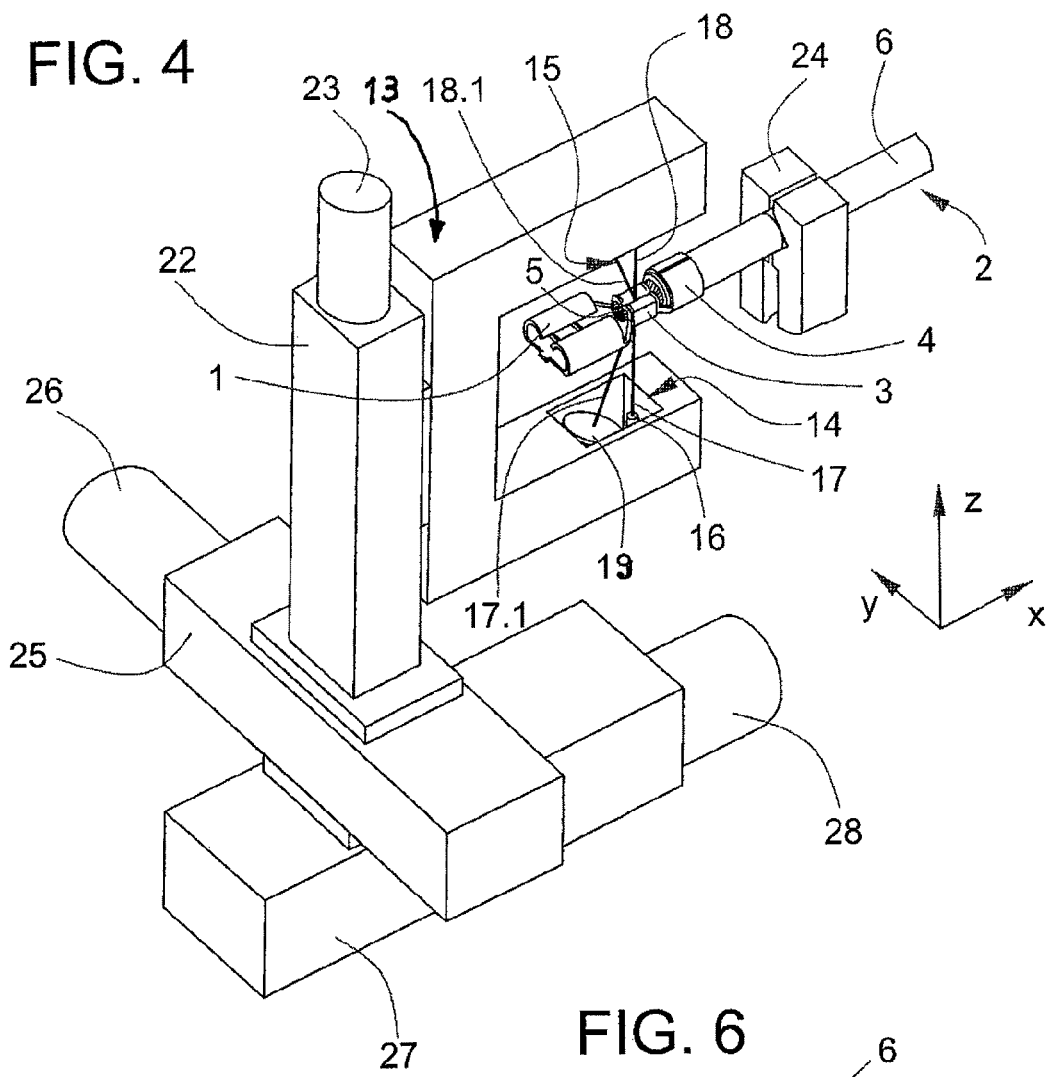
FIG. 4 is a perspective view of a measuring device for contactless scanning of the wire fitting according to the present invention.

FIG. 4 shows a measuring device for contactless scanning of a wire fitting according to the present invention. Arranged on a U-shaped housing 13 are a first distance sensor 14 and second distance sensor 15. The first distance sensor 14 serves the purpose of contactlessly scanning the wire fitting, in the example shown the crimp contact 1, from below. The second distance sensor 15 serves the purpose of contactlessly scanning the wire fitting, in this case the conductor crimp 1, from above.

Figure 6:
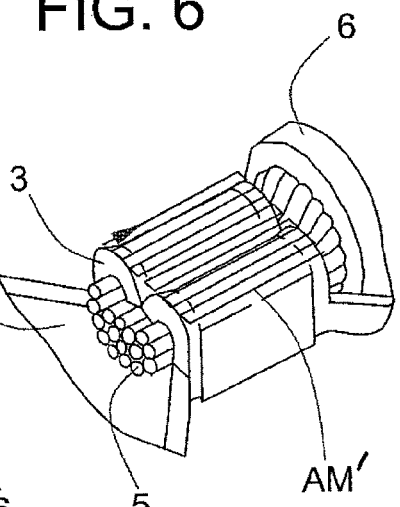
FIGS. 5 and 6 are schematic perspective views of different scanning patterns according to the present invention.
Figure 5:
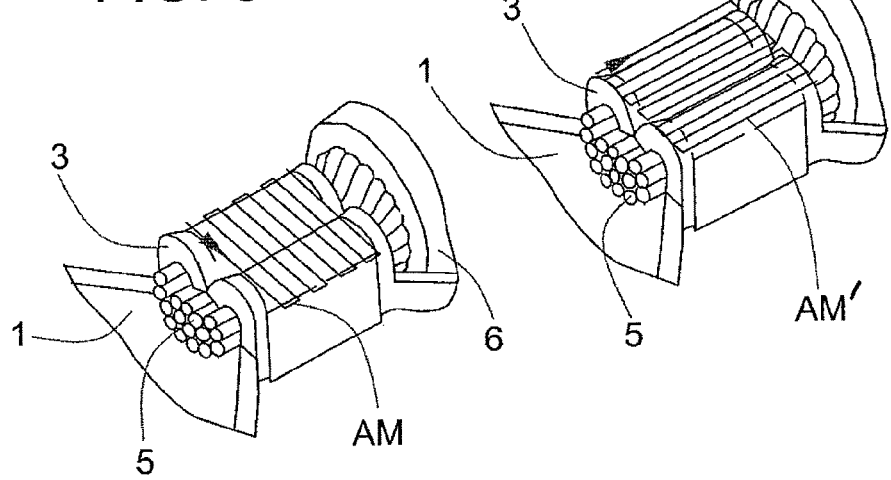

The housing 13 is arranged on a first linear unit, for example on a first linear slide 22, that moves the housing 13 in the "z" direction by means of z drive 23. The wire 2 is held in a certain position in the "z" direction by means of grippers 24. The optimal position of the wire fitting 3 in the "z" direction for measuring the distance that is given by the distance sensors 14, 15 can be set with the first linear slide 22. The first linear slide 22 is arranged on a second linear unit, for example on a second linear slide 25, that moves the first linear slide 22 in the "y" direction by means of y drive 26. The second linear slide 25 is arranged on a third linear unit, for example on a third linear slide 27, that moves the second linear slide 25 in the "x" direction by means of x drive 28. With the x and y drives 26, 28, the distance sensors 14, 15, as shown in FIGS. 5 and 6, are moved relative to the wire fitting 3 according to a certain scanning pattern. In addition, at each distance measurement as described further below, the respective "x" and "y" coordinates are registered by, for example, the linear encoder of the linear slide or by the shaft encoder of the x and y drive respectively.

Provided as the distance sensors 14, 15 is, for example, a distance sensor that determines the distance from a measurement object, in the example shown the surface of the wire fitting, in this case the surface of the conductor crimp. A transmitter 16 generates a focused point light beam or point laser beam 17 that impinges on the surface of the measurement object. In a receiver 19, a light beam 17.1 that is diffusely reflected by the measurement object is focused onto a light receiving element, for example a position sensitive device (PSD) element or a charged coupled device (CCD) element. The distance measurement by means of triangulation is based on the comparison of similar triangles. From the displacement detected by the receiver, the distance of the measurement object can be deduced, since the position of the light patch on the light receiving element depends on the distance from the measurement object being scanned. The output signal of the light receiving element changes depending on the position of the light patch.

FIGS. 5 and 6 show how a light beam 18 of the second distance sensor 15 is moved relative to the wire fitting according to a certain scanning pattern AM. The light beam 17 of the first distance sensor 14 is moved on the lower side of the wire fitting, in this case the wire crimp 3, according to the same scanning pattern AM. FIG. 5 shows the scanning pattern AM that runs perpendicular to the longitudinal axis of the wire. FIG. 6 shows a scanning pattern AM' that runs parallel to the longitudinal axis of the wire. To generate the scanning patterns AM, AM', the wire 2 is moved with the wire fitting or the housing 13, or the housing 13 and the wire 2 are moved with the wire fitting. The scanning pattern AM, AM' can also have curved lines.

Figure 7:
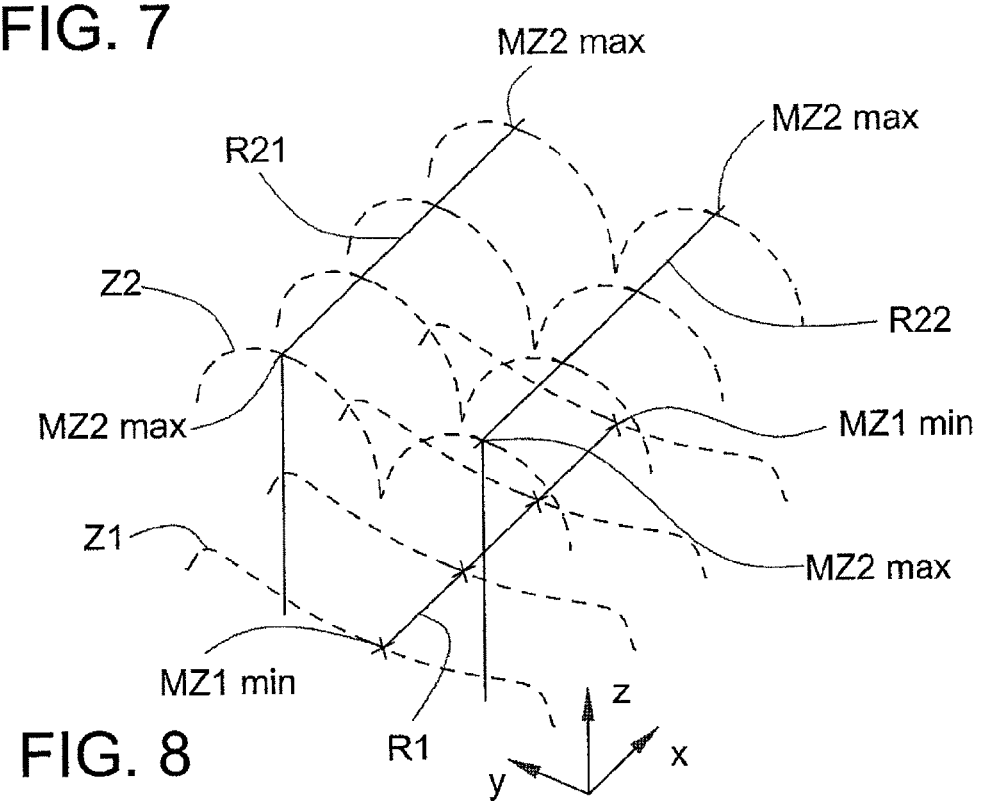
FIG. 7 illustrates measurement of distance along the scanning pattern.

As shown in FIG. 7, distance measurements Z1 and Z2 are performed along the scanning pattern AM as follows: The light beams 17 and 18 are moved to a first measuring point with the coordinates x1, y1. The movement in the "x" direction can be performed by, for example, the housing 13 or the linear unit 27, and the movement in the "y" direction by means of the gripper 24. The housing 13, and/or the linear units 27, 25 or the gripper 24 can also perform the movement in the "x" and "y" directions. At the first measurement point with the coordinates x1, y1, the distance or measurement value M1 of the respective transmitter from the surface of the wire fitting is determined. The distance given by the measurement value M1Z1 of the distance measurement Z1 and the distance given by the measurement value M1Z2 of the distance measurement Z2 are saved in a table together with the coordinates x1, y1 of the first measurement point. The light beams 17, 18 are then moved to the second measuring point with the coordinates x2, y2 and the measurement value M2Z1 and the measurement value M2Z2 determined and saved together with the coordinates x2, y2 in the table. The further distance measurements Z1, Z2 are performed analogously.

The distance can be measured absolutely, for example from the distance sensor to the surface of the wire fitting. The distance can also be assigned relative to a certain reference point. For example, the first measuring point can be used as reference point and the distances of the other measuring points related to it. The measured distances can also be converted into "z" coordinates and saved in the table together with the "x", "y" coordinates. It is important for the measurement values of the distance measurements of each distance sensor to be related to one and the same coordinate zero point.

To determine the distance of the two distance sensors 14, 15, a plate with a known thickness can be brought by means of the grippers 24 between the distance sensors 14, 15 and a distance measurement performed. The sensor distance, or distance from sensor to sensor, is the sum of the measured distance from the one sensor to the plate and of the distance from the other sensor to the plate and of the thickness of the plate. The coordinate zero point can, for example, be laid on the one distance sensor and the "z" coordinates of the other distance sensor determined from the separation of the distance sensors.

The number of the distance measurements Z1, Z2 is determined depending on the complexity of the surface of the measurement object or of the wire fitting. FIG. 7 shows spatially the distance measurements Z1 of the first sensor 14 and the distance measurements Z2 of the second sensor 15. All measured values together result in a three-dimensional image of the surface of the wire fitting, in this case the conductor crimp 3.

Depending on the complexity of the surface of the measurement object or of the wire fitting, more than two sensors, for example also sensors that scan the wire fitting from the side, can be provided.

Figure 8:
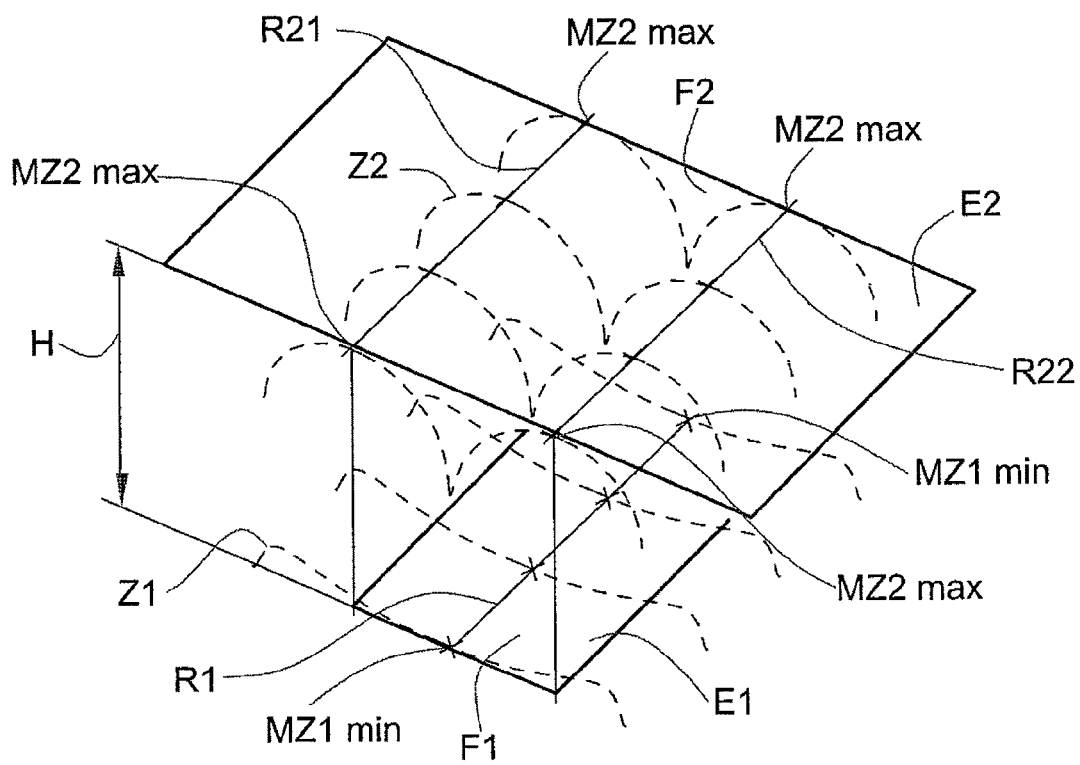
FIG. 8 illustrates a determination of the height of the wire fitting.

FIG. 8 shows how geometrical data as, for example, the height H of the wire fitting or the height of the wire crimp 3, are determined from the image of the surface. The minima MZ1min and the maxima MZ2max are determined by calculation from the measurement values of the distance measurements Z1 and Z2 respectively.

Theoretically, these MZ2max and MZ1min values lie on linear regression lines R1, R21, R22, which theoretically run parallel to each other. In this case, the regression line R1 of the MZ1min values lies exactly in the middle below the other two regression lines R21, R22.

Practically, and under optimal conditions, (new crimp die, new crimp anvil, homogenous contact material, correct stripped length, no measurement error), these MZ2max and MZ1min values lie relatively close to the linear regression lines R21, R22, R1 formed by these values that run virtually parallel to each other. In this case, the regression line R1 of the MZ1min values lies exactly in the middle below the other two regression lines R21, R22. The crimp height H is now the shortest distance from a point of the lower regression line R1 to an upper level E2 that is formed by two points of the one upper regression line R21 and a point of the other upper regression line R22 or vice versa.

A further method of calculating the crimp height H is to use two parallel surfaces, where the height H is the distance between the surfaces. The extent and starting position of the surfaces is chosen in such manner that the surfaces only take into consideration measuring points that are relevant for the evaluation, in this case the zone by the conductor crimp. They also need not be of the same dimension, so, for example, the surface F1 in the "y" direction is smaller (without burrs 12) than the surface F2, but of equal size in the "x" direction.

Figure 9A:
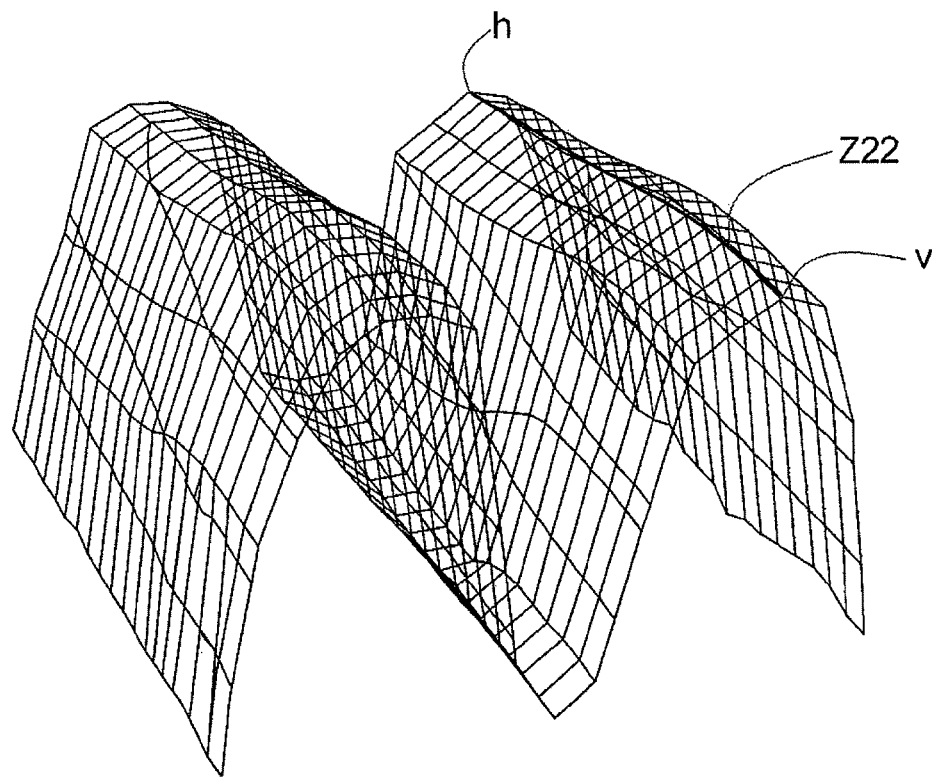
FIGS. 9a and 9b show a surface model and a wire model of a conductor crimp.
Figure 9B:
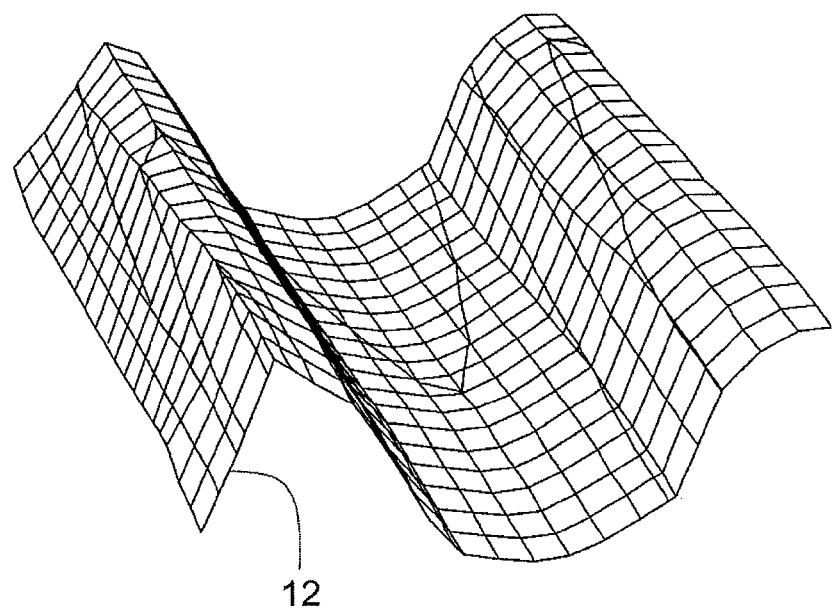

FIGS. 9a and 9b show a measured image of the surface, in this case a wire model of the wire crimp 3 formed by the conductor crimp and the crimp anvil. The wire model is created from the measurement values of the distance measurements Z1, Z2 that are saved in the table or from the "z" coordinates and the associated "x", "y" coordinates.

FIG. 9a shows a wire model of a cutout of about two by two millimeters of the conductor crimp 3 in which the shape is determined by the conductor crimp.

FIG. 9b shows a wire model of the same cutout of the wire crimp 3 in which the shape is determined by the crimp anvil. Clearly visible is the allowable burr 12 on the left side. However, the distance measurements Z1 of the burr 12 lie outside the surface F1 and are therefore not evaluated.

Figure 10A:
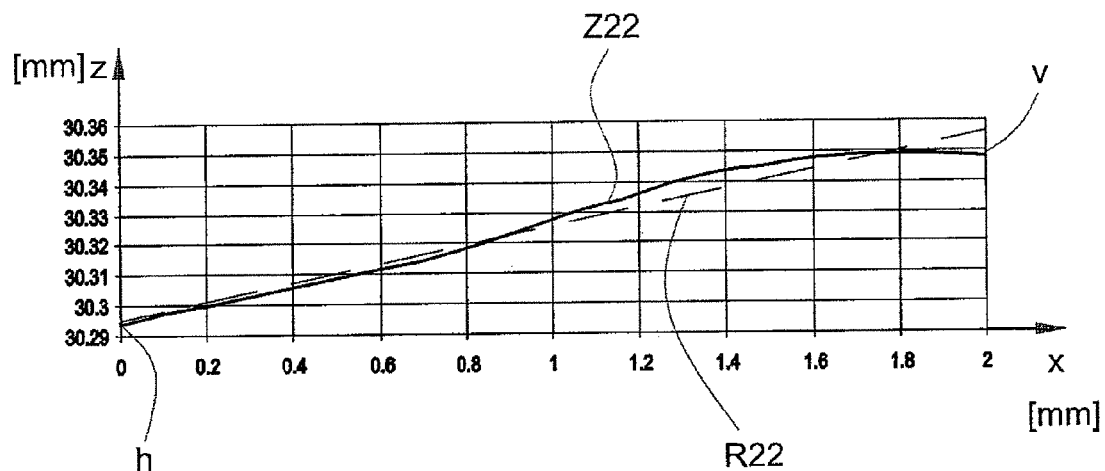
FIG. 10a is a graph of a regression line determined from measurement values.

FIG. 10a shows the line Z22 (bold line) that is formed from the MZ2max values of FIG. 9a and the regression line R22 (dotted line) calculated from it.

Determination of the regression line is generally known and can be summarized as follows: A regression line is that straight line that runs through the measurement values that form a point cloud for which the square of the distances of the data pairs (z, x) from the straight line is minimized. The regression line of FIG. 10a follows the equation $z(x)=ax+b$ where "a" is the slope of the straight line and "b" the section of axis on the "z" axis.

The line Z22 and the regression line R22 extend from behind h to in front of v of the conductor crimp cutout mentioned above. On the "x" axis, the two millimeters of the cutout are represented and on the "z" axis the measurement values of the distance measurements Z2. The regression lines R1 and R21 are determined analogously to the regression line R22.

FIG. 10a shows that the crimp contact 1, and therefore also the conductor crimp 3, hangs slightly towards the back h in space (approximately 1.8°). Furthermore, the twist of the crimp contact 1 about the longitudinal axis of the wire, for example, can be determined. The twist can be determined, for example, from the position of the surface that is given by the regression line R22 and a point of the regression line R21.

Figure 10B:
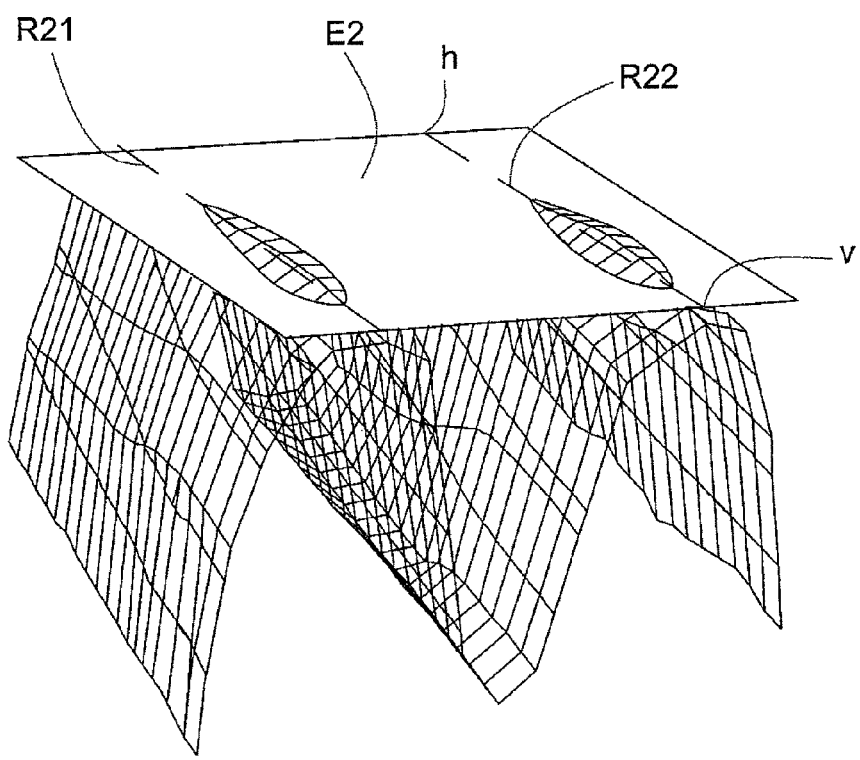
FIG. 10b illustrates a plane on which regression lines are traced.

FIG. 10b shows on the wire model of FIG. 9a the plane E2 that is traced by the regression line R22 and by a point of the regression line R21. Through the plane E1 lying parallel to the plane E2 on a point of the regression line R1, the crimp height H can be determined as the distance between the two planes E1, E2.

In practice, however, the wire fitting to be measured, in this case the conductor crimp 3 to be measured, deviates from the ideal shape, for example on account of random isolated unevennesses or measurement deviations. To take account of, or reduce, these effects, a suitable optimization method can be used. The plane E2 may in places slightly penetrate into the wire model, as shown in FIG. 10a, or may slightly deviate from the regression line, provided that these depths of penetration or deviations are significantly smaller than the required measurement accuracy. The crimp height then corresponds to the distance between the planes that have been slightly corrected in the "z" direction.

Figure 11:
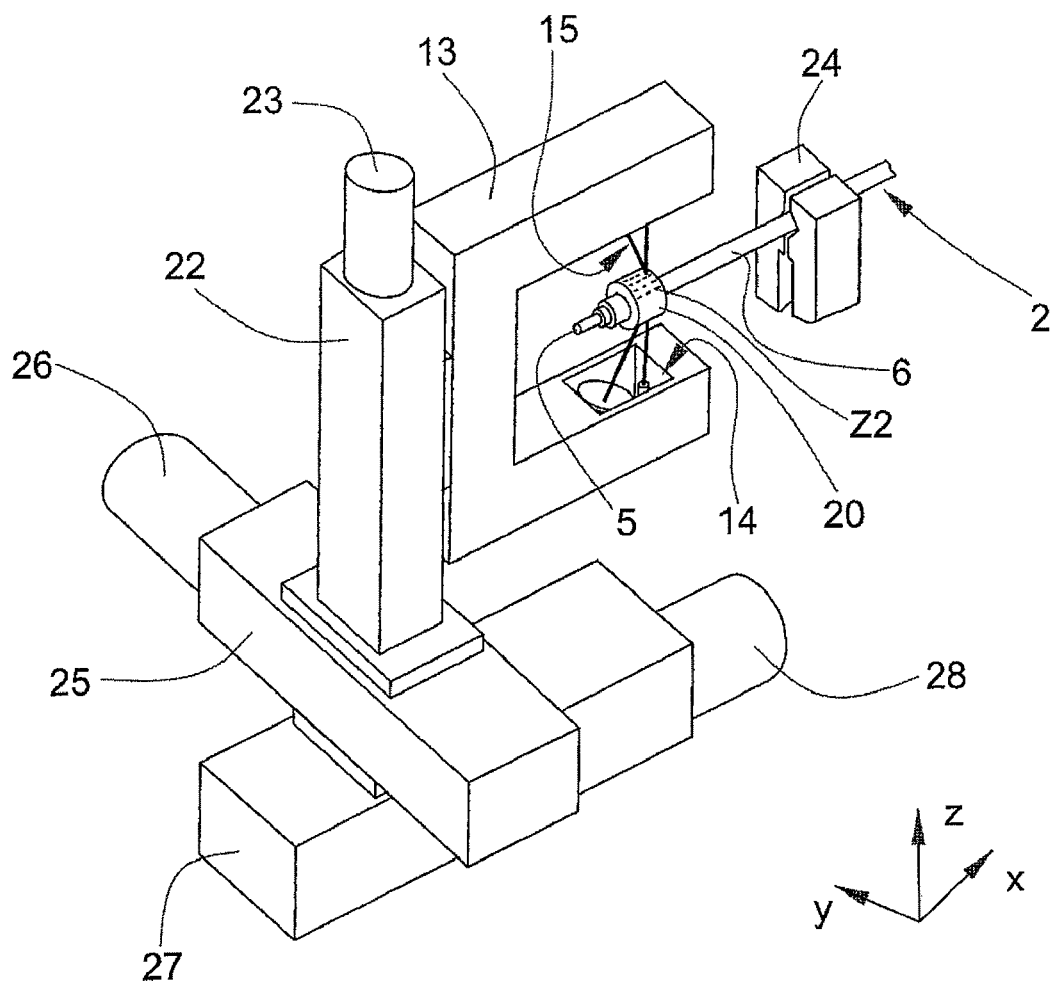
FIG. 11 is a perspective view of a contactless scanning of a sleeve foreseen as a wire fitting.

FIG. 11 shows the measurement device according to the present invention for contactless scanning of a wire fitting or sleeve 20 that is fitted over the wire insulation 6. Instead of the sleeve 20, a sealing element, a bush, or a similar fitting can be provided. The stripped wire conductor 5 can also be scanned. Scanning of the wire fitting and evaluation of the measurement values takes place in similar manner to that described above. In this case, regression lines no longer lie on a flat plane, but on a cylindrical surface. From the regression line, the diameter of the wire fitting, in this case the sleeve 20, can be determined.

Figure 12:
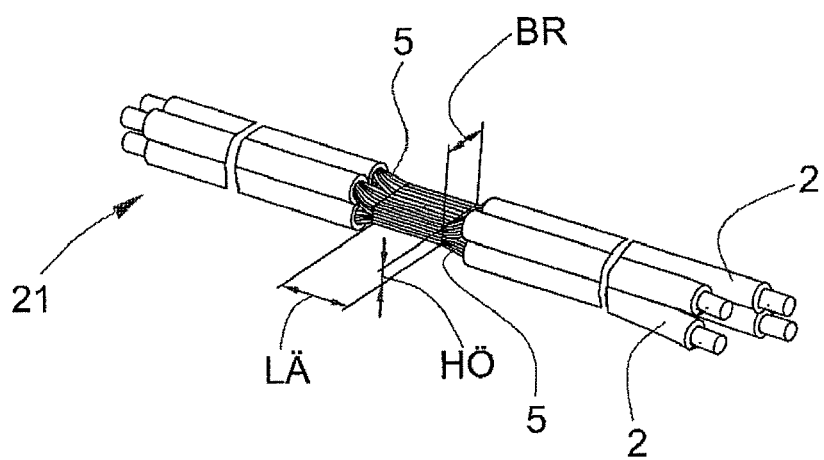
FIG. 12 is a perspective view of a wire harness with a contactlessly scannable connection.

FIG. 12 shows a wire harness 21 that consists of several of the wires 2, the stripped wire conductors 5 being connected by means of electro-welding or ultrasonic welding. For this purpose, a compression of the cross section or volume is required with the dimensions width BR, height HÖ, and length LÄ. The dimensions must be maintained as accurately as possible during production. Validation of the dimensions can take place by means of the measurement device and the method according to the present invention as described above also during production. The distance measurements can be performed with two pairs of sensors that are offset by 90°. In this case, for an accurate evaluation, a serial scanning of the two pairs of sensors is advantageous. Also conceivable is only one pair of sensors as described above, the wire harness 21 being scanned, then turned by 90° and scanned again. Instead of turning the wire harness 21 after the first measurement, the sensor pair can also be turned by 90°.

Figure 13:
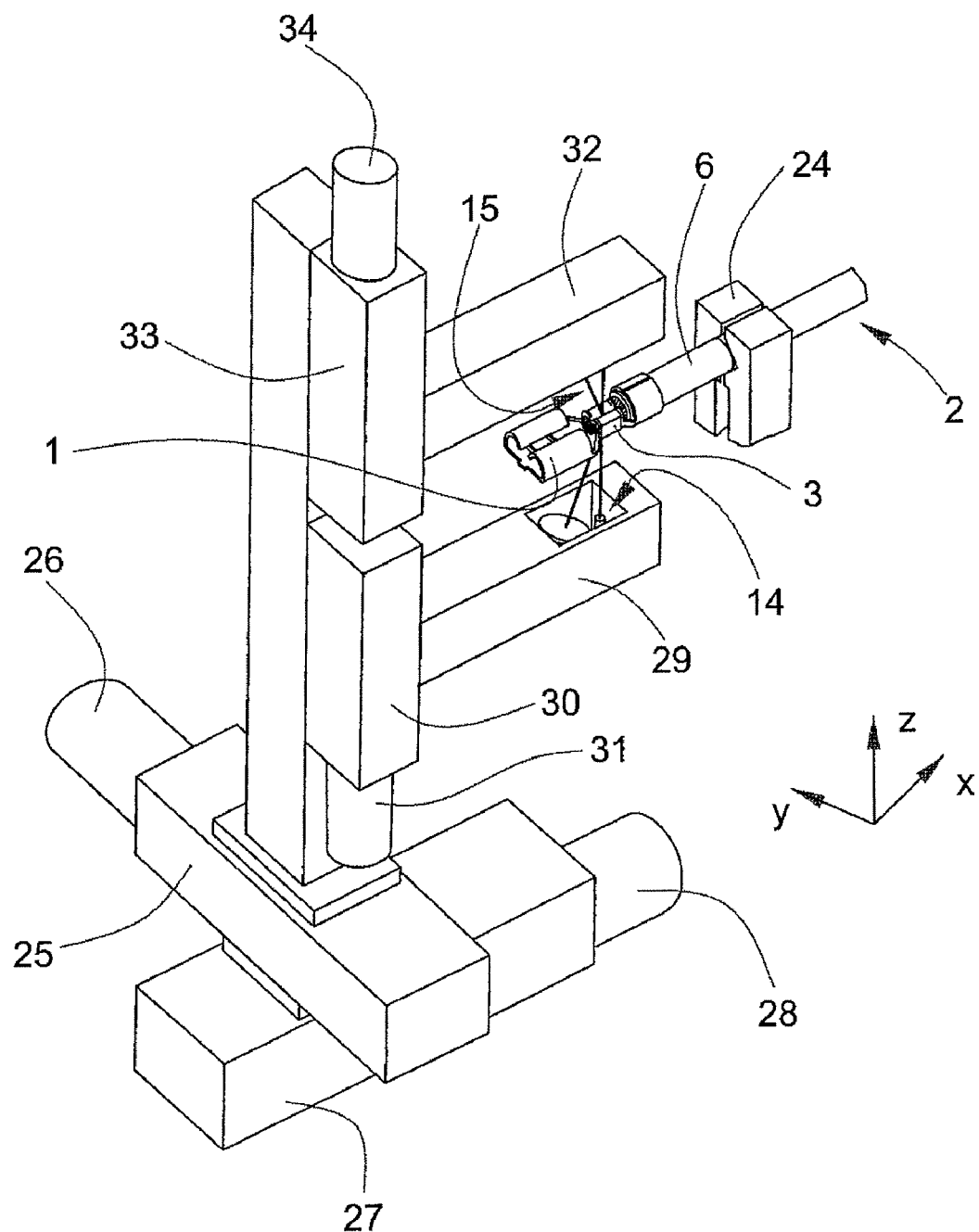
FIG. 13 is a perspective view of a variant embodiment of the measuring device according to the present invention.

FIG. 13 shows a variant embodiment of the measuring device according to FIG. 4, in which the first distance sensor 14 is movable in the "z" direction and the second distance sensor 15 in the "z" direction. A housing 29 of the first distance sensor 14 is arranged on a first lower linear unit, for example on a first lower linear slide 30, that moves the housing 29 in the "z" direction by means of a z1 drive 31. A housing 32 of the second distance sensor 15 is arranged on a first upper linear unit, for example on a first upper linear slide 33, that moves the housing 32 in the "z" direction by means of a z2 drive 34. The first lower linear slide as also the first upper linear slide is equipped with a linear encoder and each z drive is equipped with a shaft encoder, the exact position of the respective distance sensor in the "z" direction being determinable by means of the linear encoder or shaft encoder.

Different than in the distance measurement according to FIG. 4, in this variant embodiment the distance measurements are performed by means of the respective linear encoder in the "z" direction, at each distance measurement the respective distance sensor being moved to the same distance measured by the distance sensor to the surface of the wire fitting. As before, the "x", "y" coordinates of the distance measurement and the measurement value of the distance measurement, i.e. the distance measured by the linear encoder or shaft encoder respectively to the surface of the wire fitting, are saved in the table.

instead of the aforesaid distance sensor that that performs a triangulation measurement with a point laser beam, a distance sensor can also be used that performs a triangulation measurement with a line laser beam. This distance sensor projects from a line optic a laser line onto the surface of the measurement object, in this case onto the surface of the wire fitting. An optic forms an image of the diffusely reflected light of the laser line on a matrix of a light receiving element. The distance sensor determines from the linear image the distance information, meaning the distance from the line points to the sensor and the associated positions of the points in the line, i.e. the "x" coordinates of the points on a coordinate zero point of the sensor, that is in turn set in relation to the "x" coordinates of the third linear slide 27. Saving of the measurement values and coordinates in a table and evaluation of the table take place as described above.

By comparison with the point laser beam, the sensor with line laser beam scans more efficiently and therefore faster. The scanning pattern AM, AM' according to FIG. 5 or FIG. 6 can be processed line by line. One line has performed on it one measurement and then the next line.

Other sensors for measuring a distance, for example sensors that work on the principle of radar, are also possible.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for determining the geometrical data of a wire fitting in which the surface of the wire fitting is scanned and therefrom geometrical data of the wire fitting determined, comprising the steps of:
   a. providing a device for determining the geometrical data of the wire fitting, the device including a pair of distance sensors each for measuring a distance from the surface of the wire fitting contactlessly, wherein one of the distance sensors is positioned above the wire fitting and an other of the distance sensors is positioned below the wire fitting, each of the distance sensors including a light beam transmitter and a light beam receiver, the light beam receiver receiving a light beam that is diffusely reflected by the surface of the wire fitting for measurement of a distance from the surface of the wire fitting, a plurality of linear units for moving the distance sensors relative to the wire fitting along three axes, and a pair of grippers for holding the wire in a position, wherein at least one of the linear units and the grippers move the distance sensors and the wire fitting relative to one another along at least two of the three axes;
   b. performing a plurality of contactless distance measurements on the surface of the wire fitting with the distance sensors to obtain measurement values;
   c. creating a three-dimensional surface model of the wire fitting from the measurement values, wherein the three-dimensional surface model includes a plurality of measurements values from one of the distance sensors and a plurality of measurement values from the other of the distance sensors, the measurement values including z coordinates converted from measured distances taken at a plurality of x, y coordinates, the measurement values from the pair of distance sensors spatially separated from one another and together resulting in the three-dimensional surface model of the wire fitting; and
   d. determining the geometrical data of the wire fitting from the surface model.

2. The method according to claim 1 characterized wherein the contactless distance measurements are performed according to a predetermined scanning pattern.

3. The method according to claim 1 wherein that measurement values of the contactless distance measurements are determined by a triangulation measurement.

4. The method according to claim 1 wherein the contactless distance measurements are performed on several sides of the wire fitting.

5. The method according to claim 4 wherein the contactless distance measurements are performed on a lower side of the wire fitting by the one of said distance sensors and on an upper side of the wire fitting by the other of said distance sensors.

6. The method according to claim 1 including calculating from the measurement values of the contactless distance measurements regression lines and determining the geometrical data of the wire fitting from the regression lines.

7. The method according to claim 6 wherein the geometrical data include a minima z coordinate and a maxima z coordinate for the three-dimensional model, and under optimal conditions each of the minima and maxima z coordinates lie substantially on one of the regression lines.

8. The method according to claim 1 including determining coordinates of an associated one of the measurement values of the contactless distance measurements and saving the coordinates together with the associated one of the measurement values in an electronic table.

9. A device for determining the geometrical data of a wire fitting in which the surface of the wire fitting is scannable, comprising:
   a pair of distance sensors each for measuring a distance from the surface of the wire fitting contactlessly, wherein one of said distance sensors is positioned above the wire fitting and an other of said distance sensors is positioned below the wire fitting, each of said distance sensors including a light beam transmitter and a light beam receiver, the light beam receiver receiving a light beam that is diffusely reflected by the surface of the wire fitting for measurement of a distance from the surface of the wire fitting;
   a plurality of linear units for moving said distance sensors relative to the wire fitting along three axes; and
   a pair of grippers for holding the wire in a position, wherein at least one of said linear units and said grippers move said distance sensors and the wire fitting relative to one another along at least two of the three axes.

* * * * *